US012597594B2

(12) United States Patent 　 (10) Patent No.: 　 US 12,597,594 B2
Kushima et al. 　 (45) Date of Patent: 　 Apr. 7, 2026

(54) LITHIUM MANGANESE COMPOSITE OXIDE FOR A LITHIUM SECONDARY BATTERY CATHODE ACTIVE MATERIAL

(71) Applicants:University of Central Florida Research Foundation, Inc., Orlando, FL (US); Honda Motor Co., Ltd., Tokyo (JP)

(72) Inventors: Akihiro Kushima, Orlando, FL (US); Takashi Hakari, Wako (JP); Yoshiyuki Morita, Wako (JP); Yoshiya Fujiwara, Wako (JP); Akihisa Tanaka, Wako (JP); Kazumasa Sakatsume, Wako (JP)

(73) Assignees: University of Central Florida Research Foundation, Inc., Orlando, FL (US); Honda Motor Co., Ltd., Tokyo (JP)

( * ) Notice: Subject to any disclaimer, the term of this patent is extended or adjusted under 35 U.S.C. 154(b) by 494 days.

(21) Appl. No.: 18/189,640

(22) Filed: Mar. 24, 2023

(65) Prior Publication Data

US 2024/0322122 A1 　 Sep. 26, 2024

(51) Int. Cl.
　 *H01M 4/36* 　 　 (2006.01)
　 *H01M 4/02* 　 　 (2006.01)
　 (Continued)

(52) U.S. Cl.
　 CPC ........... *H01M 4/364* (2013.01); *H01M 4/131* (2013.01); *H01M 4/485* (2013.01); *H01M 4/505* (2013.01);
　 (Continued)

(58) Field of Classification Search
　 CPC ...... H01M 4/364; H01M 4/131; H01M 4/485; H01M 4/505; H01M 2004/021; H01M 2004/028
　 (Continued)

(56) References Cited

U.S. PATENT DOCUMENTS

| 2006/0083989 | A1* | 4/2006 | Suhara | ............... | C01G 45/1228 |
| | | | | | 429/231.95 |
| 2012/0077088 | A1* | 3/2012 | Donoue | ................ | H01M 4/505 |
| | | | | | 252/182.1 |

(Continued)

FOREIGN PATENT DOCUMENTS

| JP | 3208227 | B2 | 9/2001 |
| JP | 2002145619 | A | 5/2002 |
| JP | 2002167220 | A | 6/2002 |

OTHER PUBLICATIONS

Lavi et al., "Studies of the Electrochemical Behavior of LiNi0. 80Co0. 15Al0.05O2 Electrodes Coated with LiAlO2", (Aug. 28, 2017), Journal of The Electrochemical Society, 164 (13) A3266-A3275 (Year: 2017).*

(Continued)

*Primary Examiner* — Sadie White
*Assistant Examiner* — Robert Gene West
(74) *Attorney, Agent, or Firm* — Molly L. Sauter; Trenam Law

(57) ABSTRACT

A nickel-free and cobalt-free cathode for a lithium (Li) battery is provided. The lithium manganese composite oxide material of the cathode has a sloping discharge voltage profile between 3V to 4 V. The material comprises multiple crystal structures with R3-m, C2/m, and Pmnm space groups, and is characterized to maintain a high capacity when these phases are in a specific ratio.

20 Claims, 5 Drawing Sheets

(51) Int. Cl.
　　　*H01M 4/131*　　　(2010.01)
　　　*H01M 4/485*　　　(2010.01)
　　　*H01M 4/505*　　　(2010.01)

(52) U.S. Cl.
　　　CPC ................. *H01M 2004/021* (2013.01); *H01M 2004/028* (2013.01)

(58) Field of Classification Search
　　　USPC ........................................................ 429/224
　　　See application file for complete search history.

(56) References Cited

U.S. PATENT DOCUMENTS

2023/0058900 A1* 2/2023 Jeong ...................... H01M 4/62
2025/0062339 A1* 2/2025 Braida .................. H01M 4/505

OTHER PUBLICATIONS

Hirayama, M. et al. Structure and electrode reactions of layered rocksalt LiFeO2 nanoparticles for lithium battery cathode, Journal of Power Sources, 196 (2011) 6809-6814.

Dang, F. et al. Synthesis of Li—Mn—O mesocrystals with controlled crystal phases through topotactic transformation of MnCO3†, Nanoscale, 5 (2013) 2352.

Huang, X. et al. Hydrothermal Synthesis of Nanosized LiMnO2?—? Li2MnO3 Compounds and Their Electrochemical Performances, J. Electrochem. Soc. 2009, vol. 156, Issue 3, pp. A162-A168.

Muralidharan, N. et al. LiNixFeyAlzO2, A New Cobalt-Free Layered Cathode Material for Advanced Li-ion Batteries, 2020, https://www.sciencedirect.com/science/article/pii/S0378775320306935.

* cited by examiner

LITHIUM MANGANESE COMPOSITE OXIDE FOR A LITHIUM SECONDARY BATTERY CATHODE ACTIVE MATERIAL

BACKGROUND OF THE INVENTION

Due to the recent development and widespread use of electric vehicles (EVs), mobile electronics and stationary power supplies, there are increasing demands for secondary batteries as energy sources. Li-ion secondary batteries (LIBs) are widely used for commercial applications due to their high energy density, working voltages, long cycle lifetime, and low self-discharge rate.

Lithium containing cobalt oxide ($LiCoO_2$) and $Li(NiMn-Co)O_2$ having layered rock-salt structures are commonly used for the cathode active materials of LIBs. In addition, lithium containing manganese oxide ($LiMn_2O_4$) with spinel structure and $LiFePO_4$ with olivine structure are commercially available. Among these cathode active materials, $LiCoO_2$ and $Li(NiMnCo)O_2$ are used in a wide range of applications because of their superior cyclability and charge/discharge efficiencies. However, the cost of these materials is increasing due to the limited resources and supplies of the primary materials (Ni and Co), and they are less competitive in price for mid- to large-size batteries used in EVs. Alternatively, $LiMn_2O_4$ and $LiFePO_4$ are low cost and environmentally friendly due to the abundant supplies of Mn and Fe but have low specific capacities (~150 mAh/g). Accordingly, there are increasing demands for the development of high-capacity cathode active materials that do not contain Ni and Co while at the same time mitigating supply issues and providing price competitiveness.

Layered $LiMnO_2$ with monoclinic and triclinic structure are particularly attractive because of its high theoretical capacity, compared to spinel $LiMn_2O_4$. However, $LiMnO_2$ undergoes a phase transformation to spinel structure under lithium extraction and shows two-stage voltage plateaus near 4V and below 3V. In general, battery capacity is estimated by the change in the open circuit voltage (OCV), and it is difficult to predict the capacity of a battery that uses an active material having a flat voltage profile during discharge. In addition, the capacity below 3V is too low and the practical capacity is limited.

Accordingly, what is needed in the art is a Li-ion battery that does not contain nickel and/or cobalt, while at the same time, achieves a high energy density to avoid supply issues and remains cost competitive.

However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

In various embodiments, the present invention provides a cathode active material for Li-ion secondary batteries where limited usage of nickel (Ni) and cobalt (Co) are considered due to supply issues. The Ni- and Co-free cathode active material of the present invention has a sloping discharge voltage profile between 3V and 4V. The material contains multiple crystal structures with R3-m, C2/m, and Pmnm space groups, and is further characterized by the ability to maintain a high capacity when these phases are in a specific ratio.

In one embodiment, a lithium manganese composite oxide ($LiMnO_2$) for a lithium secondary battery cathode active material includes, a $LiMnO_2$-based crystal in Pmnm space group, a $LiMnO_2$-based crystal in C2/m space group, a $LiAlO_2$ crystal in R-3m space group and a $Li_2MnO_3$ crystal in C2/m space group.

In one example, X-ray diffraction peaks of the lithium manganese composite oxide of the present invention are observed at 15.5° originating from the $LiMnO_2$-based crystal in Pmnm space group with peak intensity A, at 18.3° originating from the $LiMnO_2$-based crystal in C2/m space group with peak intensity B, and at 18.650 originating from the $LiAlO_2$ crystal in R-3m space group and the $Li_2MnO_3$ crystal in C2/m space group with peak intensity C. In a specific example, the lithium manganese composite oxide has a range of peak intensity ratio (A+B)/C is 0.74<(A+B)/C<2.26.

The lithium manganese composite oxide of the present invention exhibits a sloping discharge voltage profile between about 3V and about 4V.

In an additional embodiment, a lithium manganese composite oxide cathode electrode for a lithium secondary battery is provided. The lithium manganese composite oxide cathode electrode includes a cathode current collector layer and a cathode layer positioned on the cathode current collector layer. The cathode layer of the lithium manganese composite oxide cathode electrode includes a lithium manganese composite oxide material, and the lithium manganese composite oxide material includes, a $LiMnO_2$-based crystal in Pmnm space group, a $LiMnO_2$-based crystal in C2/m space group, a $LiAlO_2$ crystal in R-3m space group and a $Li_2MnO_3$ crystal in C2/m space group.

In another embodiment, the present invention provides a lithium secondary battery which includes a cathode electrode comprising a cathode current collector, a cathode layer positioned on the cathode current collector layer, an anode electrode and an electrolyte positioned between the anode electrode and the cathode electrode. In this embodiment, the cathode layer includes a lithium manganese composite oxide material which includes a $LiMnO_2$-based crystal in Pmnm space group, a $LiMnO_2$-based crystal in C2/m space group, a $LiAlO_2$ crystal in R-3m space group and a $Li_2MnO_3$ crystal in C2/m space group.

The novel cathode chemistry in accordance with the embodiments of the present invention eliminates the cobalt supply issues and lowers the cost of the battery.

As such, the present invention provides a new chemistry for a cobalt-free layered transition metal oxide cathode for a lithium-ion battery. The proposed cobalt-free cathode provides for lower costs and eliminates the future risk of cobalt supply instability to provide for the sustainable production of batteries.

The embodiments are applicable to numerous fields requiring rechargeable batteries, including but not limited to, electric vehicles, portable electronics, and various other applications where high capacity, long cycle lifetime and low cost are required.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
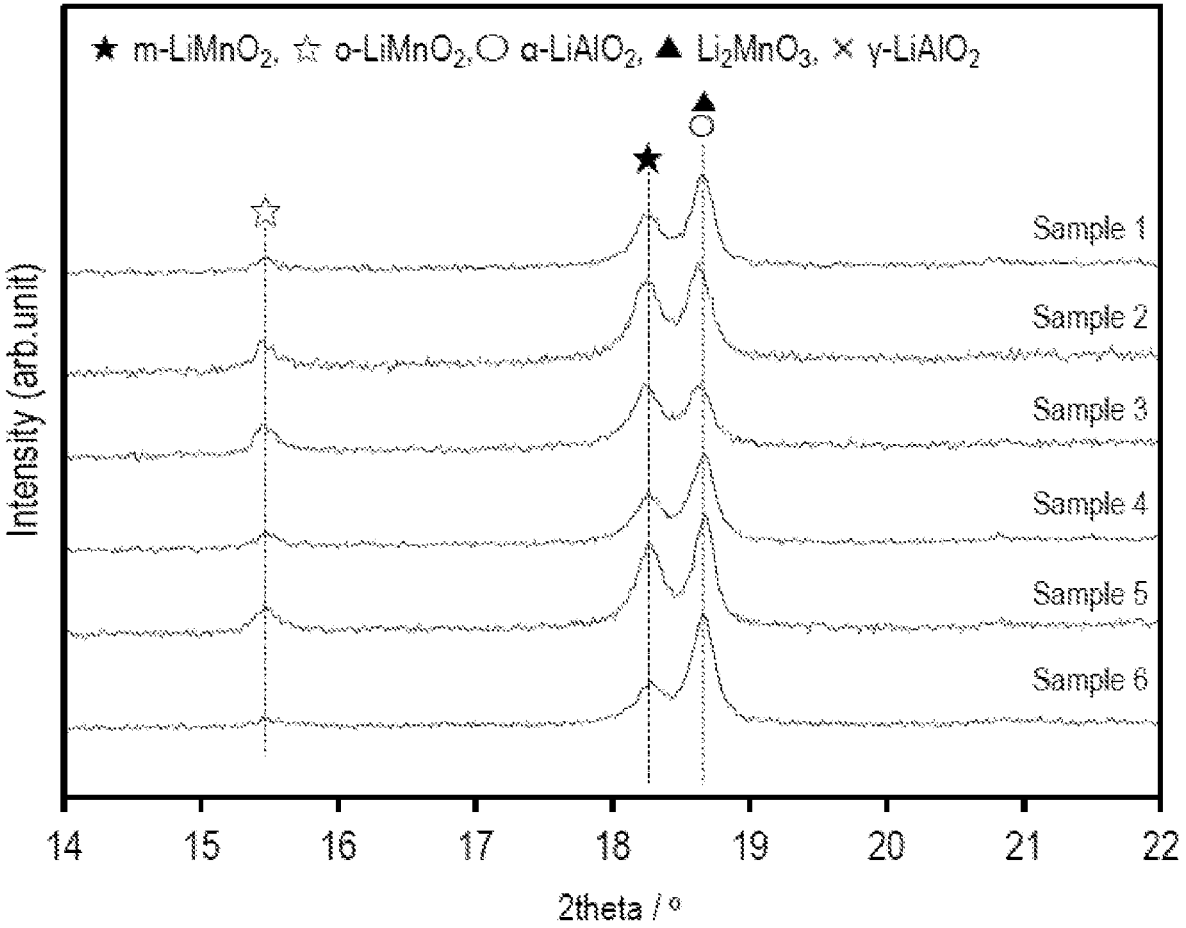
FIG. 1 illustrates powder X-ray diffraction data for lithium manganese complex oxide cathode samples 1-6.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "of" is generally employed in its sense including "and/or" unless the context clearly dictates otherwise.

In accordance with various embodiments, the present invention provides a novel Mn-based Li-ion battery (LIB) cathode having high discharge capacity, low cost, and ease of capacity estimation. The present invention additionally provides a high energy density LIBs using this novel cathode.

The Mn-based cathode active material of the present invention has a sloped voltage profile of between about 3V and about 4 V during discharge. The material exhibits a high capacity when the ratio of powder x-ray diffraction peak intensities originated from orthorhombic or monoclinic LiMnO2-based layered structure, $LiAlO_2$ with R-3m, and $Li_2MnO_3$ with C2/m is in a specific range.

The active material of the invention is a Li-containing complex oxide with $dQdV^{-1}$ less than $-0.12$ mAhg$^{-1}$V$^{-1}$ at 3.4V vs. Li/Li$^+$, as measured by a discharge experiment at a temperature of 25° C. in a small environmental test chamber, at a charge/discharge current density of 10 mA g$^{-1}$, starting from constant current charge (Li extraction), and with a voltage cut off upper limit of 4.3 V and a lower limit of 2.5 V.

The material of the invention is a Li-containing complex oxide that shows X-ray diffraction peaks observed at 15.5° originated from $LiMnO_2$-based crystal in Pmnm space group with peak intensity A, at 18.3° originated from LiMnO2-based crystal in C2/m space group with peak intensity B, and at 18.650 originated from $LiAlO_2$ crystal in R-3m space group and $Li_2MnO_3$ crystal in C2/m space group with peak intensity C. The range of peak intensity ratio (A+B)/C is 0.74<(A+B)/C<2.26. The experimental conditions to identify these peak intensities included, an X-ray diffractometer (Rigaku, SmartLab), an X-ray source (CuKa (0.15418 nm)), angular divergence of parallel slit analyzer: 5° incident slit lateral length: 5.0 mm, receiving parallel slit opening angle: 5.0°, K$_\beta$ filter step width: 0.01°, incident slit: ⅛°, receiving slit 1: 4.0 mm, receiving slit 2:13 mm.

The material of the invention is a lithium (Li) manganese (Mn) oxide having the characteristics as described above with one or more of the Mn sites replaced with at least one of the following metal elements: Al, Ti, V, Cr, Fe, Li, Zn, Mg, Ga, Zr, Nb, Mo, Sn.

The material of the invention is a lithium (Li) manganese (Mn) oxide having the characteristics as described above with one or more of the Li sites replaced with at least of the following metal elements: Na, Mg, Ca, Zn, Cu, Ga, Mn.

In various embodiments, the layered lithium manganese complex oxide of the present invention is fabricated by sintering a mixture of manganese hydroxide and lithium composites.

In a particular embodiment, to fabricate manganese hydroxide, precursors are obtained by dissolving at least one organometallic salt containing Mn and at least one organometallic containing element other than Mn, OH-concentrations are increased for coprecipitation, and drying is performed.

Examples of lithium composites include inorganic acid salts such as $Li_2CO_3$ and $LiNO_3$ and hydroxides such as $LiOH$ and $LiOH \cdot H_2O$ Sintering the mixture of manganese hydroxide and lithium composites can be performed at low oxygen partial pressure, including vacuum and atmosphere of $N_2$, Ar, or He. The range of the sintering temperatures may be higher than or equal to 350° C. and lower than or equal to 1200° C. and is preferentially higher than or equal to 500° C. and lower than or equal to 1000° C. The oxygen concentration after reaching the maximum temperature is kept below 10000 ppm and preferentially below 1000 ppm.

The primary particles of the inventive material are larger than or equal to about 0.01 μm and smaller than or equal to about 50 μm and preferentially larger than or equal to about 0.02 μm and smaller than or equal to 30 μm. When the material is used for an LIB cathode, the ionic transport resistance across the solid electrolyte interface increases due to the side reaction with the electrolyte when the primary particle size is too small. On the other hand, if the primary particle size is too large, resistances of electron charge transport and Li diffusivity in the active material increases due to the decreased interfacial area between the active material and the electrolyte, which causes large overpotentials under high charge/discharge current densities.

The secondary particles of the inventive material are larger than or equal to 0.1 μm and smaller than or equal to 100 µm and preferentially larger than or equal to 0.2 µm and smaller than or equal to 60 µm. It is difficult to handle the materials when the secondary particle size is too small, and it is difficult to prepare an electrode slurry when the secondary particle size is too large.

The specific surface area of the layered lithium manganese complex oxide of the present invention is larger than or equal to 0.05 m²/g and less than or equal to 100 m²/g and preferentially larger than or equal to 0.1 m²/g and less than or equal to 50 m²/g. When the specific surface area of the material is too large, the ionic transport resistance across the solid electrolyte interface increases due to the side reactions with the electrolyte. When the specific surface area is too small, resistances of electron charge transport and Li diffusivity in the active material increases due to the decreased interfacial area between the active material and the electrolyte, which causes large overpotentials under high charge/discharge current densities.

The layered lithium manganese complex oxide synthesized by the above method described above is a main material for battery reactions and can be used as a cathode active material for lithium-ion secondary batteries that can store and release Li-ions.

The cathode electrode of the invention for a lithium-ion secondary battery consists of the above-described cathode active material, a binder polymer, a conductive additive, and cathode current collector. The cathode layer can be obtained by making a slurry mixture with the cathode active material, the binder polymer (details explained below), the conductive additive and a solvent. The slurry mixture is then pasted on the cathode current collector and dried.

The ratio of the cathode active material in the cathode layer is greater than or equal to about 50 wt % and less than or equal to about 99 wt % and preferentially less than or equal to about 90 wt %. Examples of the binder polymer include, polyvinylidene difluoride, polytetrafluoroethylene, vinylidene fluoride, styrene-butadiene rubber, and polymethyl methacrylate. The ratio of the binder polymer in the cathode layer is greater than or equal to about 1 wt % and less than or equal to about 20 wt %. An insufficient amount of the binder polymer causes a reduction in the mechanical strength of the cathode and causes poor cycle lifetime. On the other hand, an excessive amount of the polymer binder reduces the battery capacity and power.

The cathode layer contains a conductive additive to enhance the electrical conductivity. Examples of the conductive additive include natural graphite, artificial graphite, and amorphous carbon materials such as acetylene black. The ratio of the conductive additive in the cathode layer is greater than or equal to about 1 wt % and less than or equal to about 20 wt %. An insufficient amount of the conductive additive causes a poor electrical conductivity, and an excess amount of the conductive additive reduces the battery capacity.

Organic solvents that dissolve or disperse the binder are used as solvents to prepare the slurry mixture. Examples of the solvents include N-methylpyrrolidone, N,Ndimethylformamide, and N,N-Dimethylacetamide. Active materials can be made into slurries with latex such as styrenebutadienerubber by adding dispersing or thickening agents.

The thickness of the cathode layer in general is between about 10 µm-200 µm. Examples of the materials used for the current collector include aluminum, stainless steel, and nickel-coated steel. Aluminum is preferentially used. The cathode layer prepared by slurry formation, pasting and drying is preferentially compressed by roll press, for example, to increase the packing density of the cathode active material.

A lithium-ion secondary battery consists of a cathode electrode, an anode electrode, and an electrolyte. The cathode active material of the present invention can be combined with any anode electrode commonly used for lithium-ion secondary batteries. For example, carbonous materials used in lithium-ion batteries can be used as the anode electrode. In addition, lithium metal and its alloys with other metals such as Al, Si, Sn, Pb, In, Bi, Sb, and Ag can be used as the anode electrode Carbonous materials used as the anode electrode may include, natural graphite, artificial graphite, coal-/petroleum-based pitch cokes, resin compositions such as phenolic resin, and various cellulose sintered at a high temperature. In addition, two or more of these carbonous materials can be combined to make an anode electrode composite. Examples of the anode current collector include, Cu, Ni, stainless steel, and Ni-coated steel, and Cu is preferentially used.

The electrolyte layer generally consists of an ionic conducting electrolyte and a separator. Porous polymer films are commonly used as separators. Examples of the separator include polyolefin polymers such as, nylon, cellulose acetate, nitrocellulose, polysulfone, polyacrylonitrile, polyvinylidene fluoride, polypropylene, polyethylene, and polybutene. In the lithium-ion secondary battery of this invention, organic solvent, polymer solid electrolyte, gel electrolyte, and inorganic solid electrolytes can be used as the ionic conductor. For organic solvent, carbonates, ethers, ketones, sulfolane composite, lactones, nitriles, and chlorinated hydrocarbons can be used. Examples include, Propylene carbonate, ethylene carbonate, vinylene carbonate, tetrahydrofuran, 2-methyltetrahydrofuran, 1,4-dioxane, 4-methyl-2-pentanone, 1,2-dimethoxyethane, 1,2-diethoxyethane, γ-butyrolactone, 1, 3-dioxolane, 4-methyl-1,3-dioxolane, diethyl ether, sulfolane, methylsulfolane, acetonitrile, propionitrile, benzonitrile, butyronitrile, valeronitrile, 1,2-dichloroethane, and the mixtures of more than one of these solvents. Examples of the salts to be dissolved in these solvents include, lithium salts such as $LiClO_4$, $LiAsF_6$, $LiPF_6$, $LiBF_4$, and mixtures of more than one of these salts.

In an exemplary embodiment for the fabrication of the novel material of the present invention, solution B (5 g lithium hydroxide in 100 ml water) was dropped in solution A (17 g lithium nitrate dissolved in 200 ml water) to control the pH of solution A to be between about 10-11. Solution C (manganese nitrate and aluminum nitrate dissolved in 100 ml water) was dropped in solution A, having a pH between 10-11, to obtain precipitates. During the dropping of solution C, solution B was dropped as necessary to maintain the pH of solution A between about 10-11. The resulting precipitate were then dried to obtain the manganese precursor.

The X-ray diffraction measurement condition included an X-ray diffractometer (Rigaku, SmartLab), an X-ray source: CuKa (015418 nm), angular divergence of parallel slit analyzer: 5°, incident slit lateral length: 5.0 mm, receiving parallel slit opening angle: 5.0°, $K_\beta$ filter step width: 0.01°, incident slit: ⅙°, receiving slit 1: 4.0 mm, receiving slit 2: 13 mm. The peak intensity ratio (A+B)/C was obtained where A, B, C, are intensities of the peaks observed at 15.5°±0.5°, 18.3°±0.5°, and 18.650±0.5°, respectively.

The cathode electrode was prepared by making a slurry of N-methylpyrrolidone, 80 wt % active material, 10 wt % acetylene black, and 10 wt % polyvinylidene fluoride. The slurry was pasted on an aluminum foil, dried, pressed at 15 ton, and punched into a 10 mm diameter disk to prepare the cathode electrode. The total loading mass of the cathode active material was controlled to be 3.5 mg.

A coin-cell was used to test the battery capacity. The above-described cathode electrode having a 10 mm diameter was placed on a cathode cap, and a porous polyethylene film was placed on top of the cathode as a separator. After placing the polypropylene film, a gasket was used to hold the separator. A 0.5 mm thick lithium metal anode was placed on top, and a spacer was added to control the thickness. A non-aqueous electrolyte (1 M LiPF6 in a mixture of ethylene carbonate and diethyl carbonate with a volume fraction of 1:1) was then added to the cell and closed with an anode cap.

Using this coin-cell, current charge/discharge tests were conducted at a 10 mA/g of current density with respect to the mass of the active material. The upper and lower voltage limit was set to 4.3 V and 2.5 V, respectively. Here, capacity (in mAh/g) was defined as a discharge capacity of the active material in a unit weight. From the discharge curve in the above voltage range, a graph showing voltage in the vertical axis and derivative of the capacity with respect to the voltage ($dQ/dV$, $mAhg^{-1}V^{-1}$) in horizontal axis, and obtained $dQ/dV$ at 3.4V.

The following examples, Sample 1-Sample 6, and comparisons, Comparison 1-Comparison 3, were analyzed and are summarized in Table 1 below. Table 1 includes peak intensity, peak intensity ratio, differential capacity, discharge capacity of the cathode samples synthesized and described below.

Sample 1

0.232 g of $LiOH \cdot H_2O$ and 0.531 g of the precursor was mixed in a mortar and sintered for 2 hours at 950° C. to obtain a powder sample. X-ray peak intensity ratio (A+B)/C, capacity obtained from the discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Sample 2

0.216 g of $LiOH \cdot H_2O$ and 0.547 g of the precursor was mixed in a mortar and sintered for 2 hours at 950° C. to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Sample 3

0.198 g of $LiOH \cdot H_2O$ and 0.565 g of the precursor was mixed in a mortar and sintered for 2 hours at 950° to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Sample 4

0.216 g of $LiOH \cdot H_2O$ and 0.547 g of the precursor was mixed in a mortar and sintered for 0.5 hours at 950° C. to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Sample 5

0.198 g of $LiOH \cdot H_2O$ and 0.565 g of the precursor was mixed in a mortar and sintered for 6 hours at 950° C. to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Sample 6

0.316 g of $LiNO_3 \cdot H_2O$ and 0.434 g of the precursor was mixed in a mortar and sintered for 2 hours at 950° C. to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Comparison 1

0.248 g of $LiOH \cdot H_2O$ and 0.515 g of the precursor was mixed in a mortar and sintered for 2 hours at 950° C. to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Comparison 2

0.232 g of $LiOH \cdot H_2O$ and 0.531 g of the precursor was mixed in a mortar and sintered for 2 hours at 750° C. to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

Comparison 3

0.248 g of $LiOH \cdot H_2O$ and 0.515 g of the precursor was mixed in a mortar and sintered for 2 hours at 1050° C. to obtain a powder sample. X-ray peak intensity ratio (A+B)/C, capacity obtained from discharge test, and $dQ/dV$ obtained from the discharge curve are shown in Table 1. The sample was confirmed to be lithium manganese oxide containing monoclinic $LiMnO_2$, triclinic $LiAlO_2$ and monoclinic $Li_2MnO_3$ by X-ray diffraction analysis and comparing the result with the powder x-ray diffraction database #'s 01-075-8605, 01-087-1255, 01-078-5048, and 01-074-2232.

TABLE 1

Peak intensity, peak intensity ratio, differential capacity, discharge capacity of the cathode samples synthesized.

| | Peak intensities | | | dQ dV⁻¹ at | |
| | A | B | C | (A + B)/C | 3.4 V/mAh g⁻¹ V⁻¹ | Capacity/ mAh g⁻¹ |
|---|---|---|---|---|---|---|
| Sample 1 | 842 | 1444 | 1947 | 1.174 | −0.128 | 135 |
| Sample 2 | 862 | 1378 | 1477 | 1.517 | −0.152 | 149.4 |
| Sample 3 | 1001 | 1385 | 1411 | 1.691 | −0.124 | 126.5 |
| Sample 4 | 842 | 1414 | 1863 | 1.211 | −0.155 | 136.5 |
| Sample 5 | 989 | 1627 | 1934 | 1.353 | −0.136 | 128.9 |
| Sample 6 | 741 | 1211 | 2067 | 0.944 | −0.134 | 150.3 |
| Comparison 1 | 730 | 1100 | 2483 | 0.737 | −0.118 | 106 |
| Comparison 2 | 818 | 1143 | 3012 | 0.651 | −0.118 | 104.2 |
| Comparison 3 | 1370 | 1868 | 1432 | 2.261 | −0.100 | 96.8 |

Figure 2:
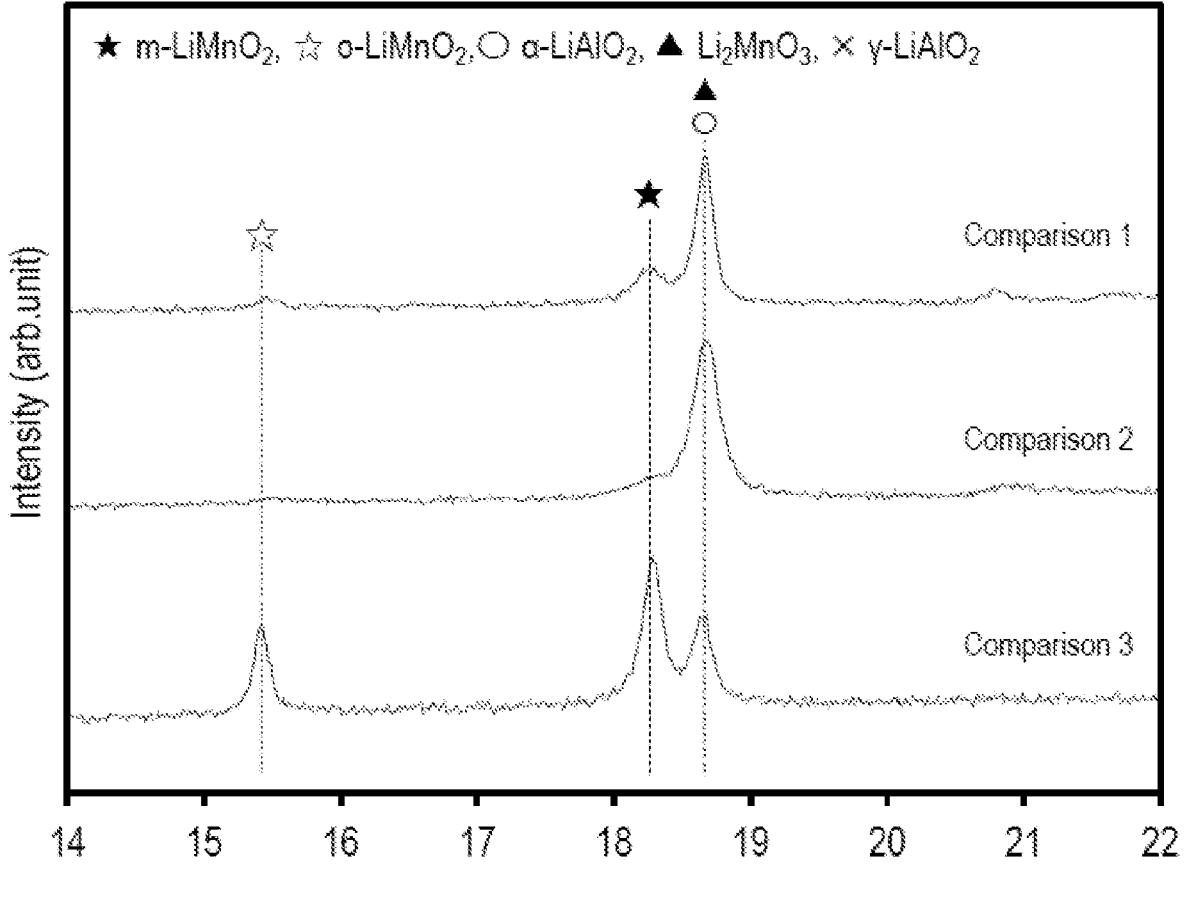
FIG. 2 illustrates powder X-ray diffraction data for lithium manganese complex oxide cathode comparisons 1-3.
Figure 3:
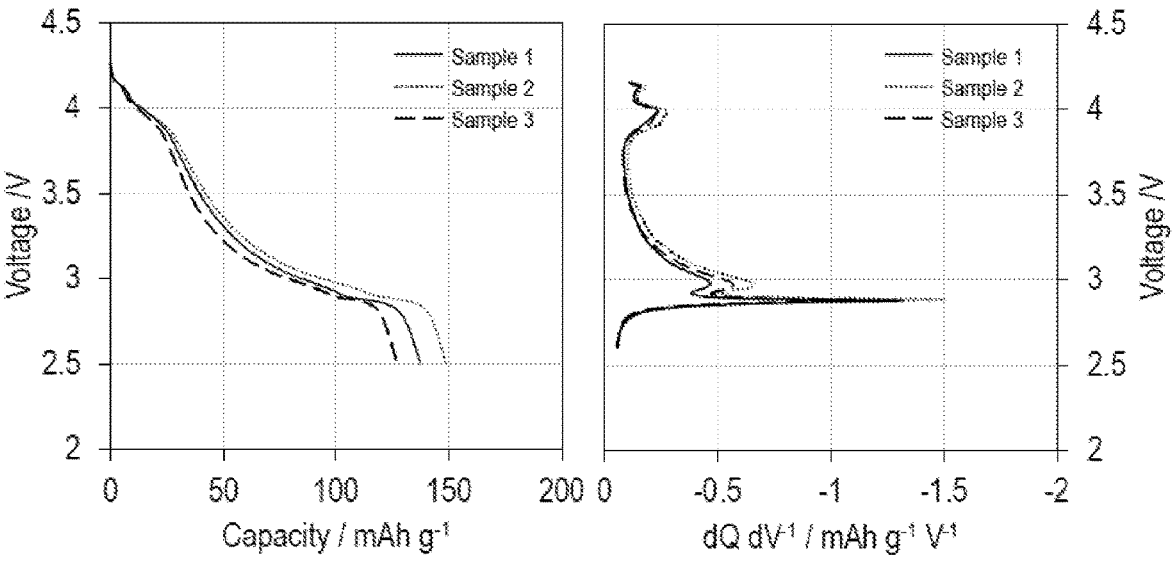
FIG. 3 illustrates a discharge curve and dQ/dV plot for lithium manganese complex oxide cathode samples 1-3.
Figure 4:
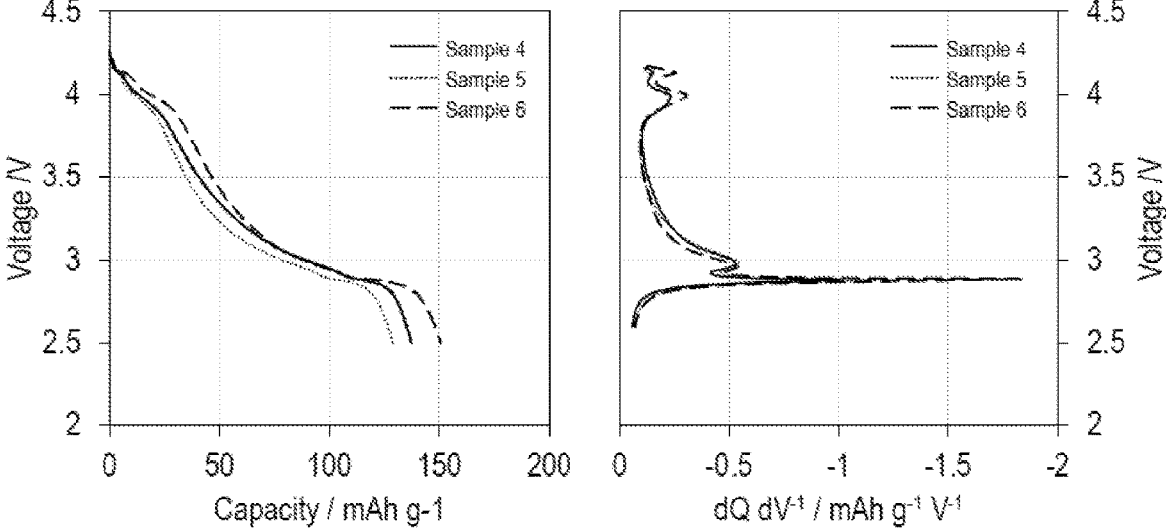
FIG. 4 illustrates a discharge curve and dQ/dV plot for lithium manganese complex oxide cathode samples 4-6.
Figure 5:
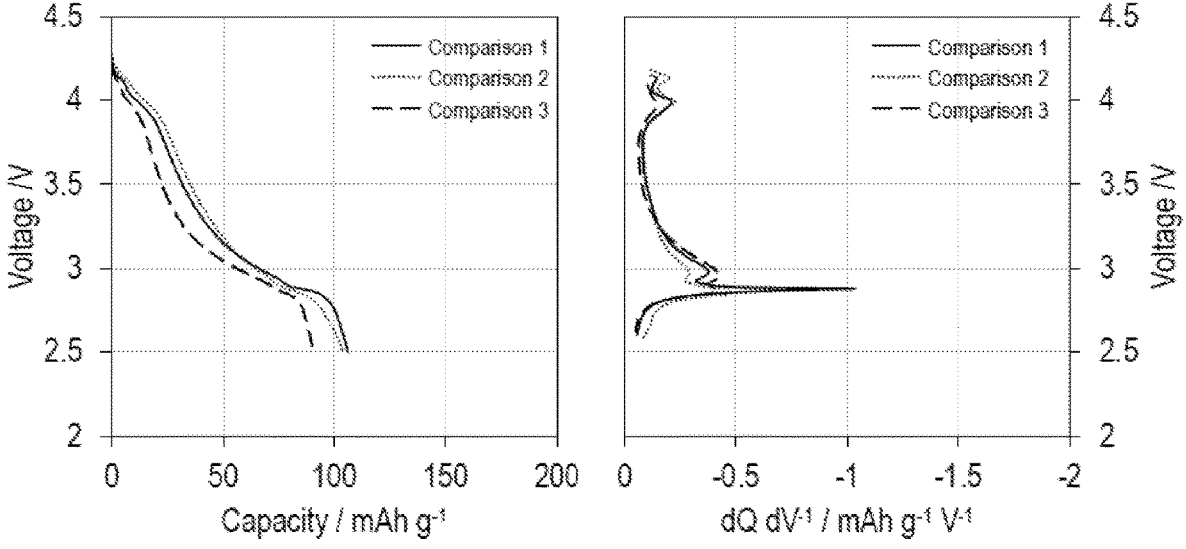
FIG. 5 illustrates a discharge curve and dQ/dV plot for lithium manganese complex oxide cathode comparisons 1-3.
Figure 6:
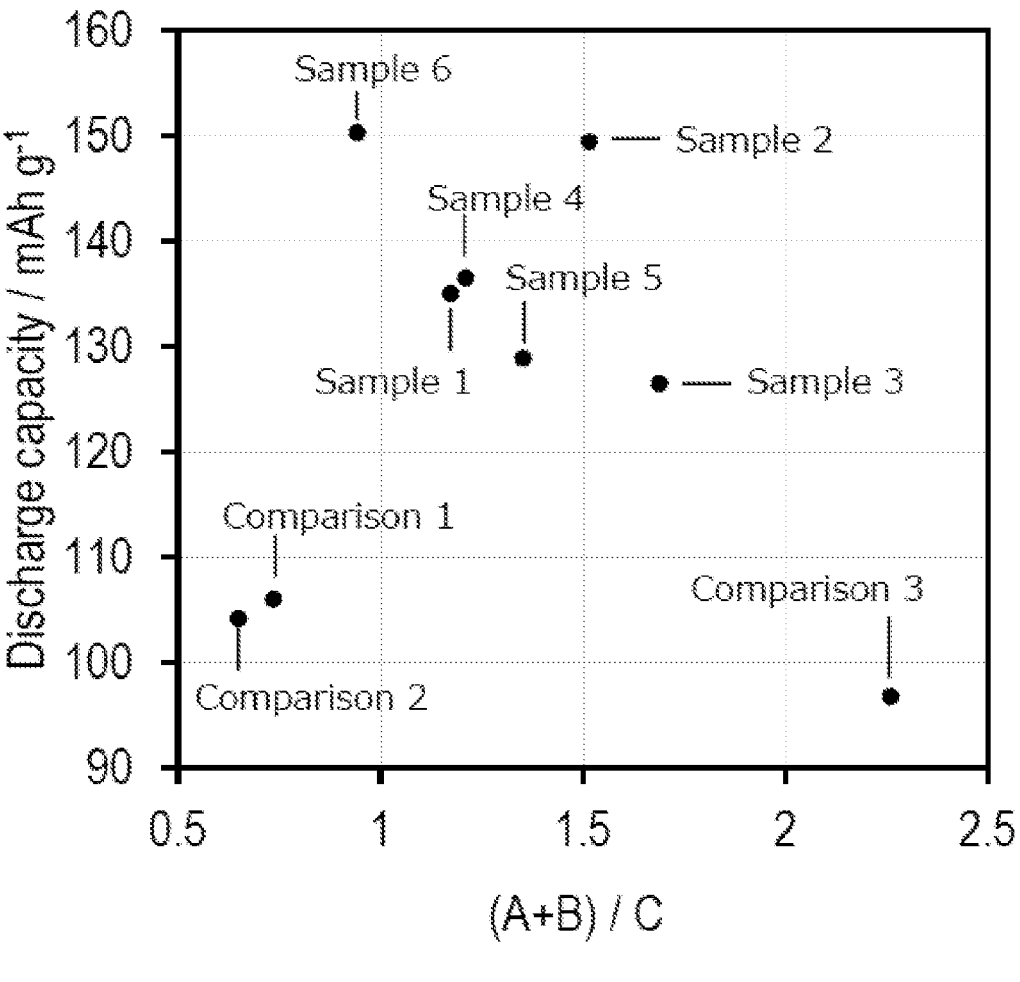
FIG. 6 illustrates a relationship between the crystal composition ratio and discharge capacity of the lithium manganese complex oxide cathode material of the present invention.

FIG. 1 illustrates powder X-ray diffraction data for samples 1-6. FIG. 2 illustrates powder X-ray diffraction data for comparisons 1-3. FIG. 3 illustrates a discharge curve and dQ/dV plot for samples 1-3. FIG. 4 illustrates a discharge curve and dQ/dV plot for samples 4-6. FIG. 5 illustrates a discharge curve and dQ/dV plot for comparisons 1-3. FIG. 6 illustrates a relationship between the crystal composition ratio and discharge capacity of the cathode material of the present invention.

As illustrated and described, the present invention provides a layered lithium manganese complex oxide having an improved initial discharge capacity that is applicable as a cathode material for lithium-ion secondary batteries.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A lithium manganese composite oxide (LiMnO₂) for a lithium secondary battery cathode active material, the lithium manganese composite oxide comprising:

a LiMnO₂-based crystal in Pmnm space group;
a LiMnO₂-based crystal in C2/m space group;
a LiAlO₂ crystal in R-3m space group; and
a Li₂MnO₃ crystal in C2/m space group, wherein the LiMnO₂-based crystal in Pmnm space group, the LiMnO₂-based crystal in C2/m space group, the LiAlO₂ crystal in R-3m space group and the Li₂MnO₃ crystal in C2/m space group are crystallographically discrete.

2. The lithium manganese composite oxide of claim 1, wherein X-ray diffraction peaks of the lithium manganese composite oxide are observed at 15.5° originating from the LiMnO₂-based crystal in Pmnm space group with peak intensity A, at 18.3° originating from the LiMnO₂-based crystal in C2/m space group with peak intensity B, and at 18.65° originating from the LiAlO₂ crystal in R-3m space group and the Li₂MnO₃ crystal in C2/m space group with peak intensity C.

3. The lithium manganese composite oxide of claim 2, wherein a range of peak intensity ratio (A+B)/C is 0.74< (A+B)/C<2.26.

4. The lithium manganese composite oxide of claim 1, wherein the manganese (Mn) crystallographic lattic positions in one or more of the space groups are partially substituted with one or more of Al, Ti, V, Cr, Fe, Li, Zn, Mg, Ga, Zr, Nb, Mo and Sn.

5. The lithium manganese composite oxide of claim 1, wherein the lithium (Li) crystallographic lattice positions in one or more of the space groups are partially substituted with one or more of Na, Mg, Ca, Zn, Cu, Ga and Mn.

6. The lithium manganese composite oxide for a lithium secondary battery cathode active material of claim 1, wherein the lithium manganese composite oxide has a sloping discharge voltage profile between about 3V and about 4V.

7. The lithium manganese composite oxide of claim 1, wherein the lithium manganese oxide material is formed by sintering a mixture of manganese hydroxide and lithium composites.

8. The lithium manganese composite oxide of claim 7, wherein the lithium composites comprise one or more of inorganic acid salts and hydroxides.

9. The lithium manganese composite oxide of claim 1, wherein primary particles of the lithium manganese composite oxide have a D₅₀, representing the median particle diameter at which 50% of the total particle volume is smaller and 50% is larger, between about 0.01 µm and 50 µm, as measured by laser diffraction particle size analysis.

10. The lithium manganese composite oxide of claim 1, wherein primary particles of the lithium manganese composite oxide have a D₅₀, representing the median particle diameter at which 50% of the total particle volume is smaller and 50% is larger, between about 0.02 µm and 30 µm, as measured by laser diffraction particle size analysis.

11. The lithium manganese composite oxide of claim 1, wherein secondary particles of the lithium manganese composite oxide have a D₅₀, representing the median particle diameter at which 50% of the total particle volume is smaller and 50% is larger, between about 0.1 µm and about 100 µm, as measured by laser diffraction particle size analysis.

12. The lithium manganese composite oxide of claim 1, wherein secondary particles of the lithium manganese composite oxide have a D₅₀, representing the median particle diameter at which 50% of the total particle volume is smaller and 50% is larger, between about 0.2 µm and about 60 µm, as measured by laser diffraction particle size analysis.

13. The lithium manganese composite oxide of claim 1, wherein a specific surface area of the lithium manganese composite oxide is between about 0.05 m²/g and about 100 m²/g.

14. The lithium manganese composite oxide of claim 1, wherein a specific surface area of the lithium manganese composite oxide is between about 0.1 m²/g and about 50 m²/g.

15. A lithium manganese composite oxide cathode electrode for a lithium secondary battery, the cathode electrode comprising:

a cathode current collector layer;
a cathode layer positioned on the cathode current collector layer, the cathode layer comprising a lithium manganese composite oxide material, wherein the lithium manganese composite oxide material comprises;

a $LiMnO_2$-based crystal in Pmnm space group;

a $LiMnO_2$-based crystal in C2/m space group;

a $LiAlO_2$ crystal in R-3m space group; and a $Li_zMnO_3$ crystal in C2/m space group, wherein the $LiMnO_2$-based crystal in Pmnm space group, the $LiMnO_2$-based crystal in C2/m space group, the $LiAlO_2$ crystal in R-3m space group and the $Li_2MnO_3$ crystal in C2/m space group are crystallographically discrete.

16. The lithium manganese composite oxide cathode of claim 15, wherein the cathode layer further comprises one or more of a binder polymer and a conductive additive.

17. The lithium manganese composite oxide cathode of claim 16, wherein the cathode layer comprises a binder polymer and a conductive additive and wherein a ratio of the lithium manganese composite oxide in the cathode layer is between about 50 wt % and about 90 wt %, a ratio of the binder polymer in the cathode layer is between about 1 wt % and about 20 wt % and a ratio of the conductive additive in the cathode layer is between about 1 wt % and about 20 wt %.

18. A lithium secondary battery comprising:

a cathode electrode comprising a cathode current collector and a cathode layer positioned on the cathode current collector layer, the cathode layer comprising a lithium manganese composite oxide material, wherein the lithium manganese composite oxide material comprises;

a $LiMnO_2$-based crystal in Pmnm space group;

a $LiMnO_2$-based crystal in C2/m space group;

a $LiAlO_2$ crystal in R-3m space group;

a $Li_zMnO_3$ crystal in C2/m space group, wherein the $LiMnO_2$-based crystal in Pmnm space group, the $LiMnO_2$-based crystal in C2/m space group, the $LiAlO_2$ crystal in R-3m space group and the $Li_2MnO_3$ crystal in C2/m space group are crystallographically discrete;

an anode electrode; and an electrolyte positioned between the anode electrode and the cathode electrode.

19. The lithium secondary battery of claim 18, wherein X-ray diffraction peaks of the lithium manganese composite oxide are observed at 15.5° originating from the $LiMnO_2$-based crystal in Pmnm space group with peak intensity A, at 18.3° originating from the $LiMnO_2$-based crystal in C2/m space group with peak intensity B, and at 18.65° originating from the $LiAlO_2$ crystal in R-3m space group and the $Li_2MnO_3$ crystal in C2/m space group with peak intensity C.

20. The lithium secondary battery of claim 19, wherein a range of peak intensity ratio (A+B)/C is 0.74<(A+B)/C<2.26.

* * * * *